May 19, 1931.                A. BOULADE                    1,806,280
         ALTIMETRIC AUTOMATIC CONTROLLING DEVICE
            FOR CARBURETORS FOR AEROPLANE MOTORS
                      Filed April 10, 1924
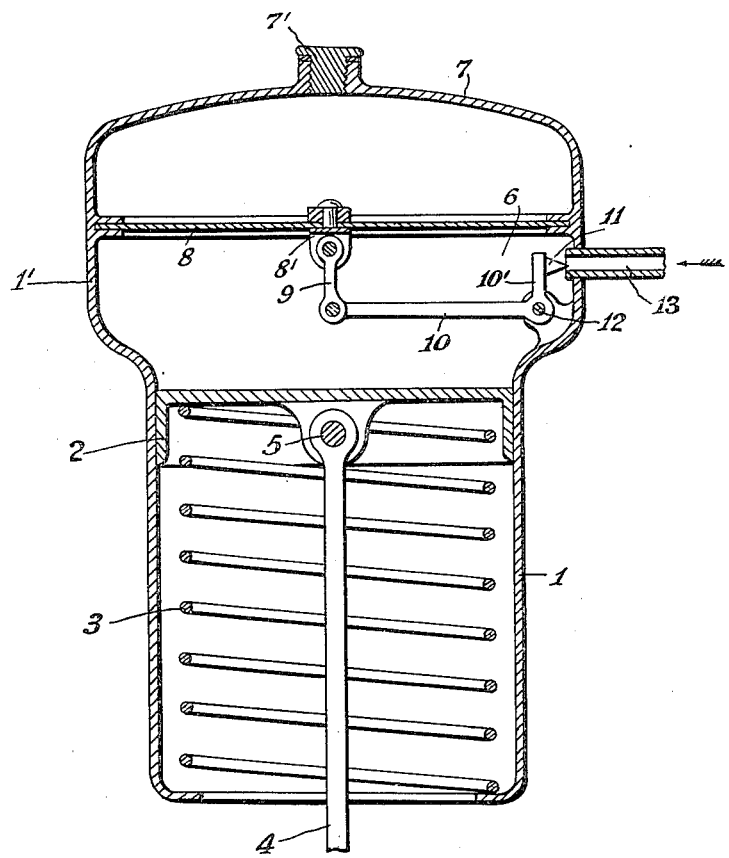
Inventor
Antonin Boulade
by
Byrnes, Stebbins, Parmelee & Blenko
his attorneys Patented May 19, 1931

1,806,280

UNITED STATES PATENT OFFICE

ANTONIN BOULADE, OF LYON, FRANCE, ASSIGNOR TO SOCIÉTÉ DU CARBURATEUR ZENITH, OF LYON, FRANCE

ALTIMETRIC AUTOMATIC CONTROLLING DEVICE FOR CARBURETORS FOR AEROPLANE MOTORS

Application filed April 10, 1924, Serial No. 705,651, and in France April 12, 1923.

It is known that in carburetors for aeroplane engines various adjustments are necessary in view of the varying altitude of the aeroplane.

Amongst these, especial mention may be made of those which have for their object the weakening of the mixture produced and the increase of compression in accordance with the altitude of the aeroplane. This latter operation generally consists in the limitation of the compression of the motor on the ground by reducing the gas opening.

It is advantageous that these operations should be automatically controlled, so that greater accuracy may be obtained, and a considerable amount of worry and the possibility of making mistakes obviated.

Various methods for effecting these automatic controls have been suggested in particular, the use of barometric capsules. Apparatus comprising such capsules are very delicate in their working, and furthermore, if they are to be kept within reasonable dimensions, they do not permit of the finest adjustments being carried out. Now, in order to operate the corrector of a carburetor as well as the throttle or any other member which enables the compression to be reduced on the ground, considerable trouble is necessary, especially if there are several carburetors to be controlled.

The present invention relates to a device for the automatic control of the carburetor, which combines the advantages of light weight and small bulk and which enables efforts to be made as considerable as may be desired, while at the same time preserving great accuracy.

The accompanying drawing shows diagrammatically a constructional form of the invention.

The device is composed of a limited number of parts, namely: a cylinder 1, partly open at one end and closed at the other end by a dome 1', this cylinder encloses a piston 2 and a helical spring 3 which operates to continuously force back the piston 2 towards the dome 1'. The piston 2 is coupled by a pin 5 to a small connecting rod 4 which actuates, directly or otherwise, the member or members of the carburetor which have to be automatically regulated in accordance with the altitude attained by the aeroplane.

The dome 1' is divided into two chambers, 6 and 7 by a membrane 8, fixed to the wall of the dome in such a manner that no communication between the two chambers is possible. The diaphragm 8 which separates the apparatus into two parts is preferably made of rubber. It is only required that this diaphragm be gas tight, there being no requirement for strength because it is not subjected to any strain, the pressure being practically the same on both sides, and the center of the diaphragm moving but very little.

To the centre of this membrane is fixed a bearing piece 8', to which is jointed a connecting link 9, which in its turn is jointed to the extremity of the arm 10 of a bell crank lever pivoted at 12, the other arm 10' of which being provided with a needle or valve 11, which is designed to close the orifice of a tube 13, which conveys into the chamber 6 a gaseous or liquid fluid at a pressure always higher than that in the chamber 7.

The top of the dome is provided with an opening which allows the admission into the chamber 7 either of air at atmospheric pressure or compressed, or of a gas at any pressure desired. This opening, after the desired fluid has been admitted, is closed by a stopper 7'.

The method of working of the device is as follows:

In the first place the upper chamber 7 is filled with air or gas at atmospheric or at any other suitable pressure.

As the tube 13 introduces a fluid at a pressure higher than that in chamber 7, this fluid endeavours to penetrate into the chamber 6 and the membrane 8 rises as soon as the pressure in this chamber exceeds, by however little, the pressure in the chamber 7. The lifting of this membrane causes the lifting of the connecting rod 9 and a pivotal movement of the bell crank lever 10, 10' so that the valve 11 closes the orifice of the pipe 13 and cuts off the supply of the fluid under pressure.

The result is to establish a state of equilibrium, so that the admission of fluid through the tube 13 compensates for the discharges, leakage or displacement caused by the piston 2, the pressure in the chamber 6 remaining in every case strictly equal to that in the chamber 7.

Above the piston 2 a constant pressure is therefore maintained equal to the pressure $H_0$ originally created in the chamber 7. Since below this piston the pressure is the atmospheric pressure $H_2$ corresponding to the altitude attained by the aeroplane, the piston descends, thereby compressing the spring 3 to a point at which the pressure of this spring is equal to the difference $H_0-H_2$ between the original pressure and the pressure corresponding to the altitude of the aeroplane.

The altimetric control of the desired members of the carburetor is therefore effected exactly in accordance with this difference in pressure. The length of piston stroke to be employed is determined by the characteristic features of the spring, while so far as the value of the effort to be produced is concerned, this may be as great as desired by giving the piston a suitable area.

In the drawing the apparatus is arranged so as to be placed vertically but it may be arranged horizontally.

The mechanism shown for the closing of the orifice of 13 by displacements of the membrane is given only by way of an example, and any other suitable means may be employed.

The fluid under pressure which enters the chamber 6 may with advantage be the gases produced by the explosion in one of the cylinders of the aeroplane motor. A tube 13 would effect in a simple manner the admission from the cylinder of the motor.

If it is desired to utilize the maximum pressure of the explosion, the tube would be connected to the upper part of the cylinder. If on the contrary it is desired to make use of only a part of the explosion pressure, which is more suitable, the tube would be arranged in such a manner that it would not be uncovered by the piston until the latter had already effected part of its stroke. This may conveniently be accomplished by connecting a suitable conduit 15 with the interior of the internal combustion engine cylinder 16 at the desired point intermediate its ends, and leading this conduit to a valve casing 17. Within this casing there may be provided an upwardly opening valve 18 serving as a check valve and permitting the flow of fluid under pressure from the cylinder into the upper portion of the valve casing. The second valve 19 may be considered as a pressure release valve, tending to vent accumulated pressure to the atmosphere after it passes a predetermined point. Conveniently, both valves may be spring loaded whereby the desired conditions of operation may be effectively obtained. The upper portion of the valve casing 17 is in turn connected by the tube 13, previously described, to the dome of the cylinder 1.

It will be understood by those skilled in the art that the device herein described is effective through the rod 4 for producing movement of any part of the carburetor which it is desired to control. The initial pressure in the chamber 7 may be of any value desired according to the results to be obtained, and the inlet 13 will maintain a similar pressure in the chamber 6 as the piston 2 moves downwardly, and thereby increases the area of the chamber 6, or as leakage past the piston takes place. If the pressure in the chamber 7 is equivalent to atmospheric pressure at sea level, then as soon as the aeroplane rises to such an altitude that the pressure in chambers 6 and 7 is greater than atmospheric pressure at that altitude, plus the pressure of the spring, the piston 2 will move downwardly and effect the desired operation of the carburetor. This operation may comprise leaning out the mixture or permitting a wider opening of the throttle at higher altitudes than nearer the ground. By reason of the provision of a spring, the amount of movement of the piston will be proportionate to pressure differences in the chambers 6 and 7 on one hand, and atmospheric pressure at the level of the apparatus, plus the pressure of the spring, on the other hand. Obviously, the length of stroke may be varied by changing the characteristics of the spring.

As the apparatus continues to ascend into thinner and thinner air, the piston will continue its downward movement and thereby effect the desired compensations, while upon movement in opposite direction, the piston will gradually move in the opposite direction, such movement being permitted by reason of the leakage past the same.

It would be possible also to use either the exhaust gases of the motor, or compressed air supplied by a small compressor driven by the aeroplane motor, or water or other liquid under pressure, etc.

What I claim as my invention and desire to secure by Letters Patent of the United States is:—

1. Alimetric automatic controlling device for aeroplane motor carburetors, comprising, in combination, a cylinder open at its lower end and terminating at its upper extremity in a chamber, a piston movably mounted in said cylinder, a spring operating to move said piston towards said chamber, a rod connecting said piston to the operating control for the carburetor, means for supplying a fluid medium to said chamber, the pressure of said medium in said chamber compressing the spring according as the external pressure exercised on the lower surface of the piston diminishes, and pressure responsive means in said chamber for controlling the admission of said medium thereto.

2. Altimetric automatic controlling device for aeroplane motor carburetors, comprising, in combination, a cylinder open at its lower end and provided with a chamber at its upper extremity, a piston movably mounted in said cylinder, a spring operating to move said piston towards said chamber, a rod connecting said piston to the operating control for the carburetor, a second closed chamber above said first mentioned chamber, a flexible membrane between said chambers, a tube for admitting fluid to said first-mentioned chamber, a valve for opening or closing the inlet of said tube to said chamber, and means operated by the said flexible membrane for operating said valve.

3. In an adjusting apparatus for carburetors, a cylinder, a piston movable therein, a pressure chamber for subjecting said piston on one side to predetermined pressure conditions irrespective of altitude, a second pressure chamber, means interposed between said chambers for controlling the pressure in said chamber, said first-named piston on its opposite side being subjected to pressures varying with the altitude, and means for connecting said piston to a control, substantially as described.

4. In an adjusting apparatus for carburetors, a cylinder, a piston movable therein, a pressure chamber for subjecting said piston on one side to predetermined pressure conditions irrespective of altitude, a second chamber having a predetermined pressure initially established therein, pressure responsive means interposed between said chambers, for controlling the pressure in said chamber, said first-named piston on its opposite side being subjected to pressures varying with the altitude, and means for connecting said piston to a control, substantially as described.

5. In an adjusting apparatus for carburetors, a piston, means for automatically subjecting said piston on one side to an invariable pressure condition, irrespective of the piston position, leakage or altitude, said means comprising constant pressure control chambers, and an interposed diaphragm for controlling the pressure in said chambers, the piston on its opposite side being subjected to pressure conditions varying with the altitude, and means for connecting said piston to a control.

6. In an adjusting apparatus for carburetors, a piston, means for subjecting said piston on one side to an invariable pressure irrespective of altitude, said piston on the opposite side being subjected to pressure conditions varying with the altitude, means for connecting said piston to a portion of the carburetor to be controlled, and a pressure responsive diaphragm for maintaining said invariable pressure.

7. In an adjusting apparatus for carburetors, a piston, means for automatically subjecting said piston on one side to an invariable pressure condition, irrespective of the piston position, leakage, or altitude, said means comprising a constant pressure control chamber a fluid pressure diaphragm and an admission valve operated thereby, the piston on its opposite side being subjected to pressure conditions varying with the altitude, and means for connecting said piston to a control.

In witness whereof I have signed this specification.

ANTONIN BOULADE.

CERTIFICATE OF CORRECTION.

Patent No. 1,806,280.  Granted May 19, 1931, to

ANTONIN BOULADE.

It is hereby certified that error appears in the printed specification of the above numbered patent requiring correction as follows: Page 3, line 26, claim 3, and lines 39 and 40, claim 4, for "chamber, said first-named" read first-named chamber,; and that the said Letters Patent should be read with these corrections therein that the same may conform to the record of the case in the Patent Office.

Signed and sealed this 1st day of September, A. D. 1931.

(Seal)
M. J. Moore,
Acting Commissioner of Patents.